(12) United States Patent
Wang

(10) Patent No.: US 8,622,490 B2
(45) Date of Patent: Jan. 7, 2014

(54) PANEL ATTACHMENT FOR WATER COOLER

(75) Inventor: Chun Yen Wang, El Paso, TX (US)

(73) Assignee: MTN Products, Inc., Pamona, CA (US)

( * ) Notice: Subject to any disclaimer, the term of this patent is extended or adjusted under 35 U.S.C. 154(b) by 342 days.

(21) Appl. No.: 12/604,010

(22) Filed: Oct. 22, 2009

(65) Prior Publication Data
US 2011/0095668 A1    Apr. 28, 2011

(51) Int. Cl.
*A47G 29/00*    (2006.01)

(52) U.S. Cl.
USPC .......... 312/265.6; 312/265.5; 222/173; 222/182; 24/453

(58) Field of Classification Search
USPC ......... 312/257.1, 204, 265.5, 265.6, 400, 7.2; 292/141, 303, DIG. 16; 222/173, 182; 403/280, 277, 329, 397, DIG. 14; 411/508–510, 913, 338, 339; 24/297, 24/453
See application file for complete search history.

(56) References Cited

U.S. PATENT DOCUMENTS

| | | | | |
|---|---|---|---|---|
| 255,858 | A * | 4/1882 | Hidden | 292/350 |
| 436,035 | A * | 9/1890 | Grothaus | 292/303 |
| 1,866,466 | A * | 7/1932 | Hassensall | 222/108 |
| 2,356,934 | A * | 8/1944 | Ketcham | 248/27.1 |
| 2,590,264 | A * | 3/1952 | Meyers et al. | 24/295 |
| 2,668,998 | A * | 2/1954 | Tinnerman | 24/662 |
| 3,740,083 | A * | 6/1973 | Zenhausern | 403/243 |
| 4,890,966 | A * | 1/1990 | Umezawa | 411/340 |
| 4,903,935 | A * | 2/1990 | Mrugala et al. | 251/9 |
| 5,387,065 | A * | 2/1995 | Sullivan | 411/48 |
| 5,542,158 | A * | 8/1996 | Gronau et al. | 24/295 |
| 5,551,817 | A * | 9/1996 | Kanie | 411/107 |
| 5,580,204 | A * | 12/1996 | Hultman | 411/509 |
| 5,645,331 | A * | 7/1997 | Eddy et al. | 312/205 |
| 5,647,713 | A * | 7/1997 | Ge et al. | 411/509 |
| 5,651,632 | A * | 7/1997 | Gordon | 403/319 |
| 5,833,416 | A * | 11/1998 | Cau | 411/55 |
| 6,074,150 | A * | 6/2000 | Shinozaki et al. | 411/508 |
| 6,871,675 | B1 * | 3/2005 | Marszalec et al. | 141/82 |
| 7,052,224 | B2 * | 5/2006 | Venus et al. | 411/512 |
| 7,320,157 | B2 * | 1/2008 | Lubera et al. | 24/295 |

OTHER PUBLICATIONS

Visions Point-of-Use; http://www.mtnproducts.com/visions-pou.html; Published by Jan. 1, 2006.
Esio Beverage System: Single Serve Hot and Cold on Demand Beverage System; http://esiobev.com (computer renderings with applicant's notations are attached) Published by Jan. 1, 2007.

* cited by examiner

*Primary Examiner* — Darnell Jayne
*Assistant Examiner* — Sasha T Varghese
(74) *Attorney, Agent, or Firm* — Michael P. Mazza, LLC

(57) ABSTRACT

A water cooler with a rapidly detachable exterior panel. A water cooler with a detachable panel may have a wrapper with at least one detachable panel, and the wrapper may have multiple apertures to receive fasteners that may receive corresponding rear surface projections located on the rear surface of the panel. A water cooler with a detachable exterior panel may have a wrapper with at least one detachable panel, and one or more tensioning devices to cause the exterior panel to be placed in frictional and removable engagement against the wrapper.

15 Claims, 6 Drawing Sheets

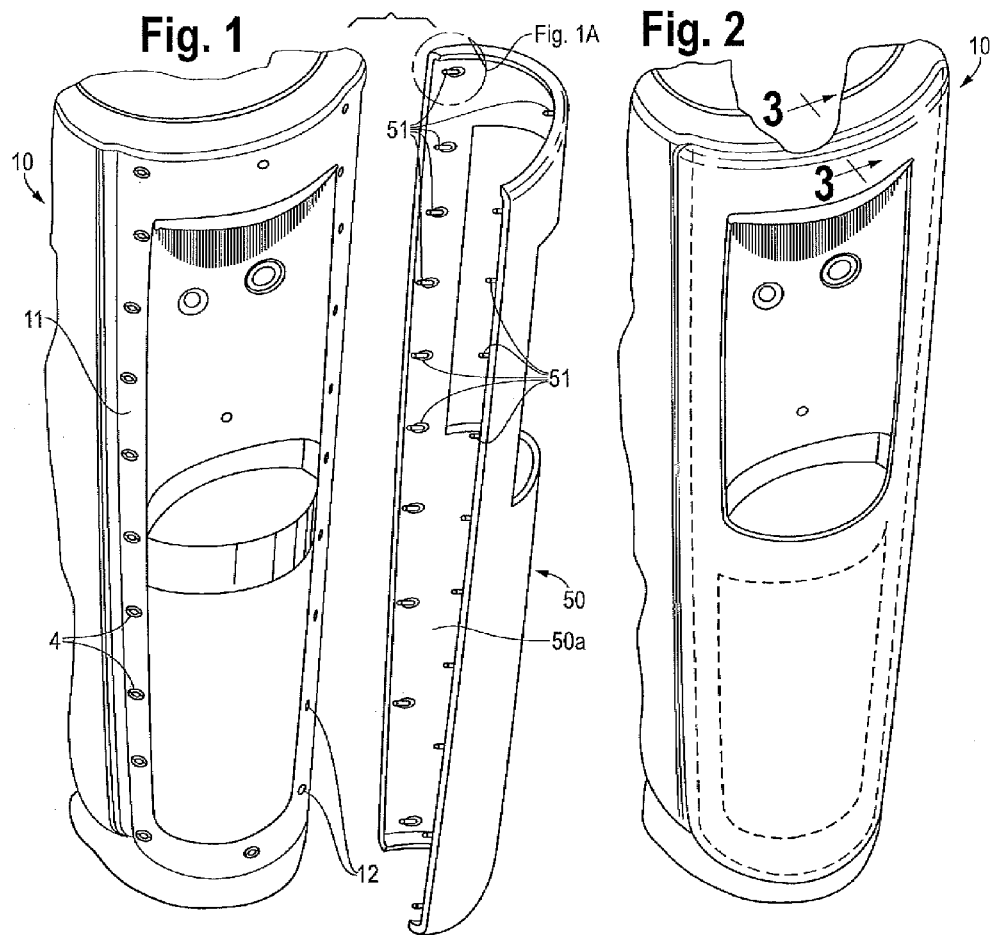
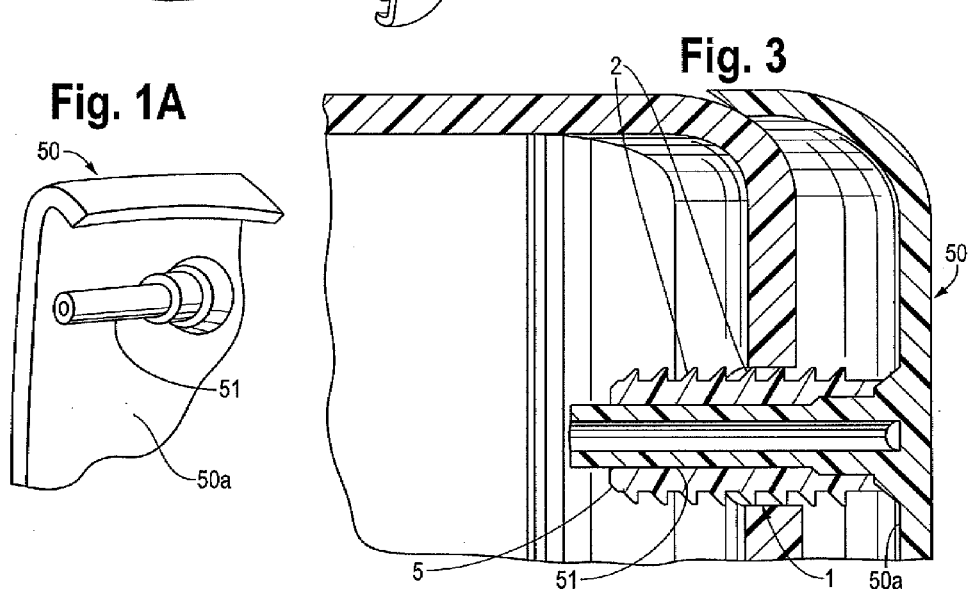

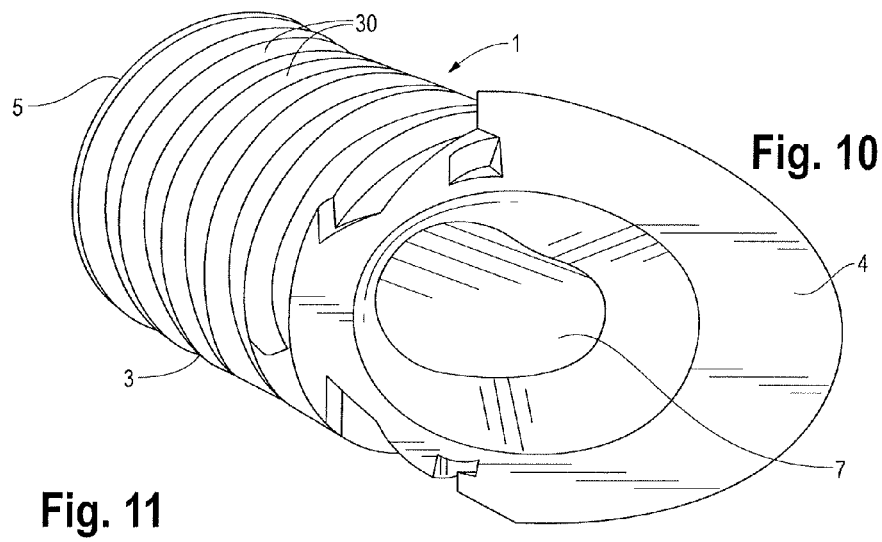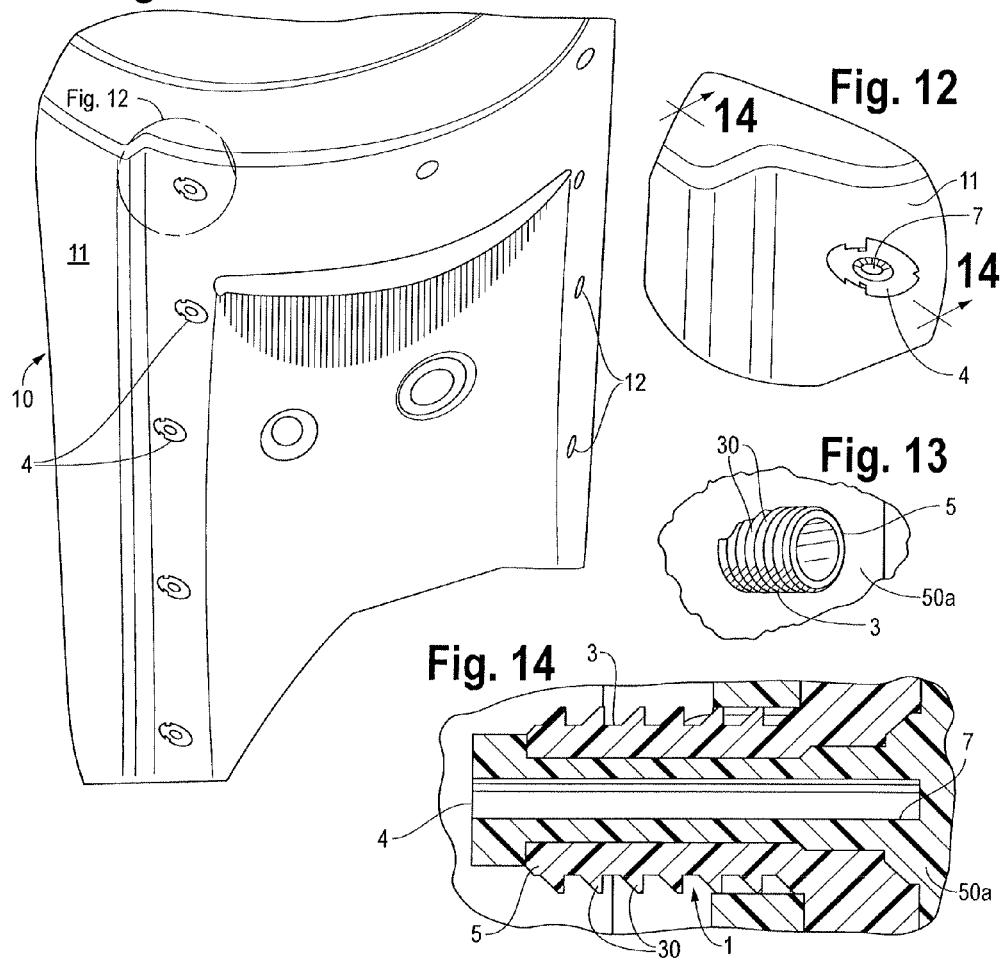

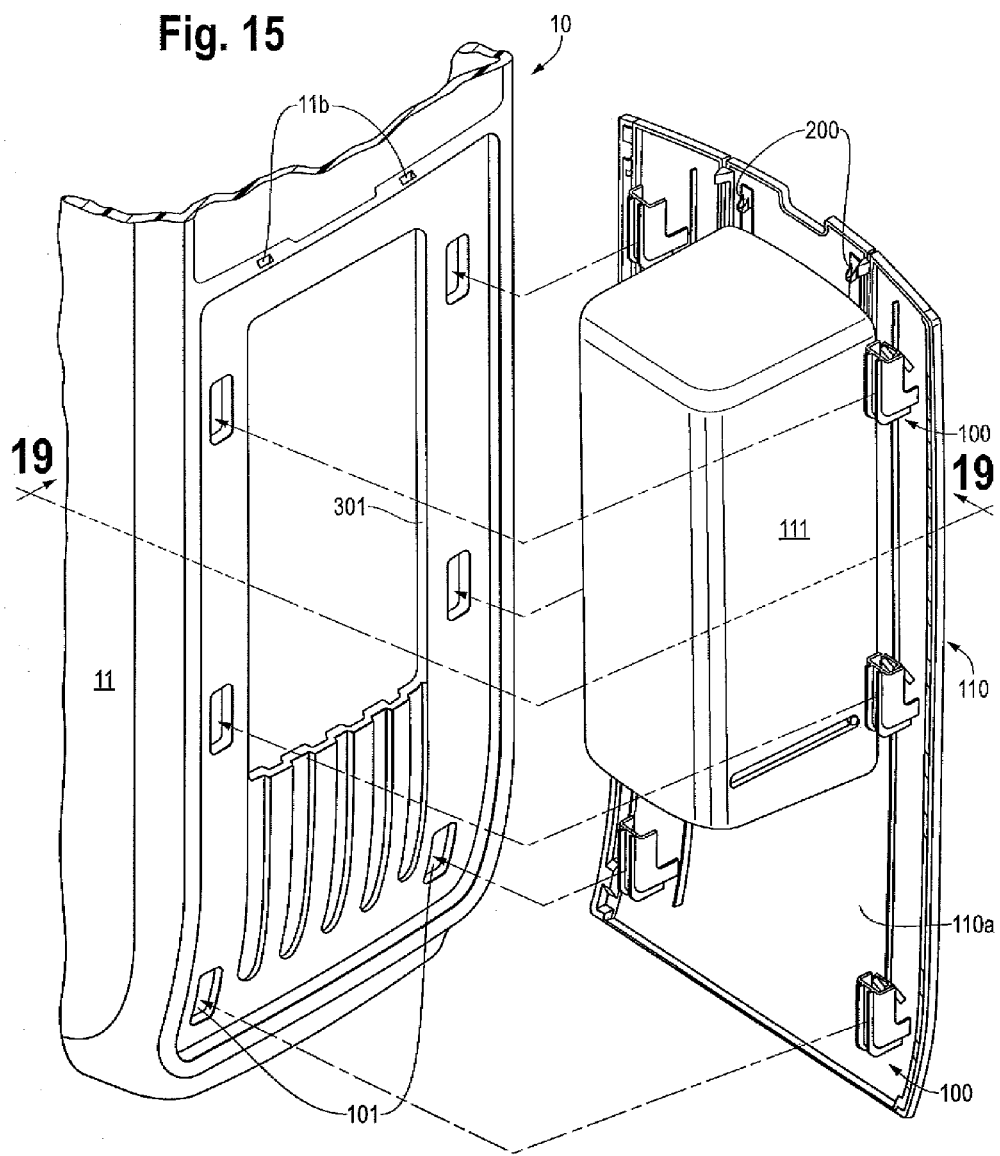

Fig. 16
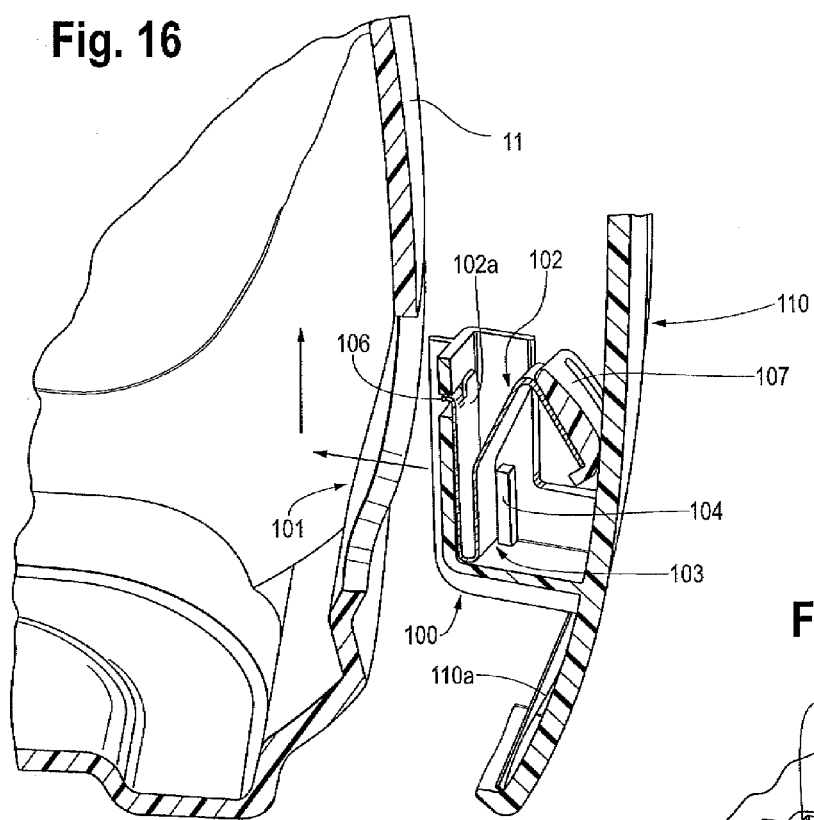
Fig. 17
Fig. 18
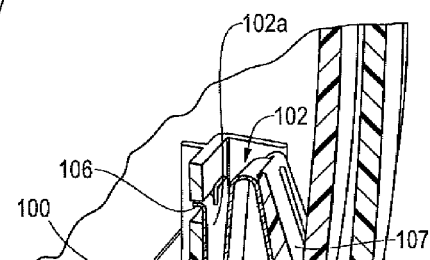
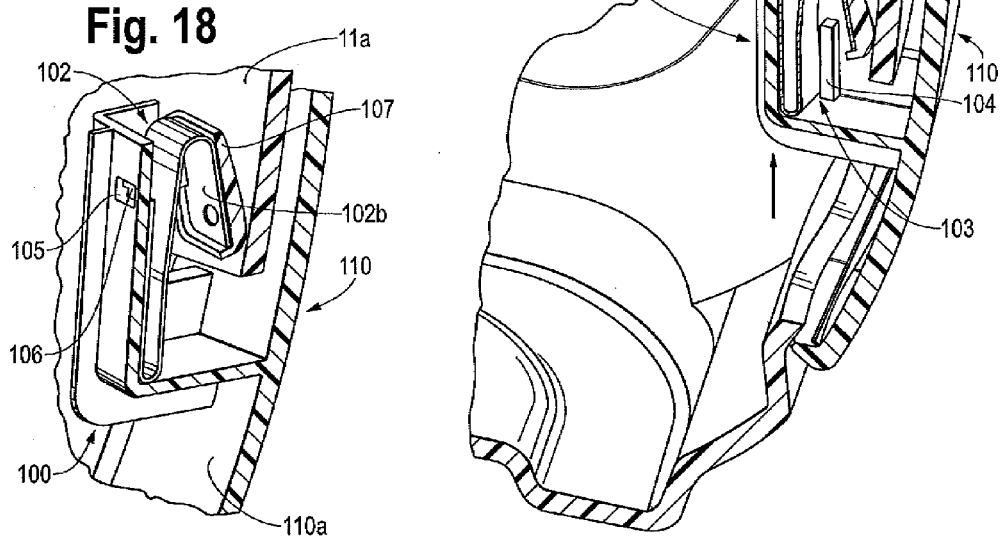

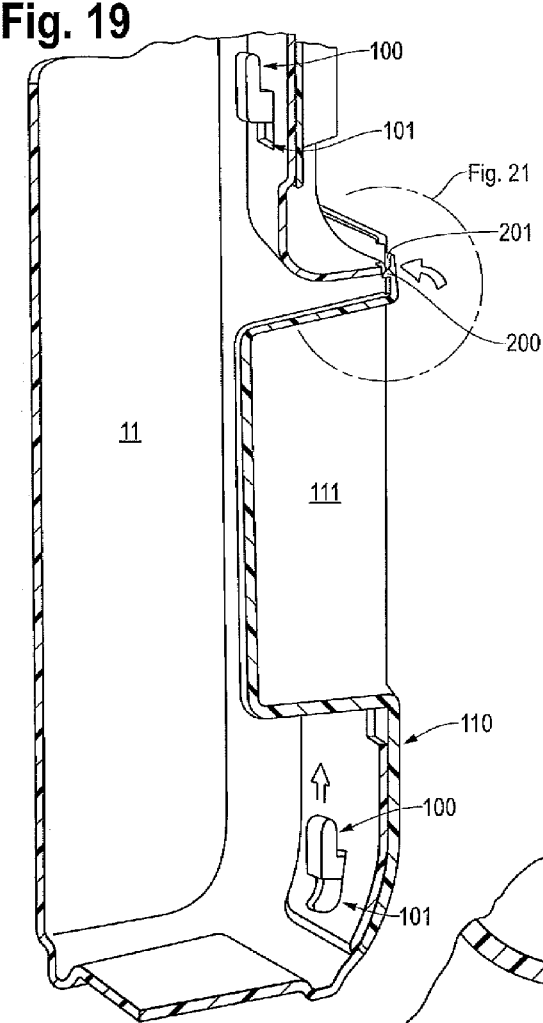
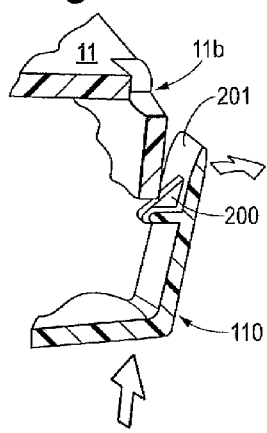
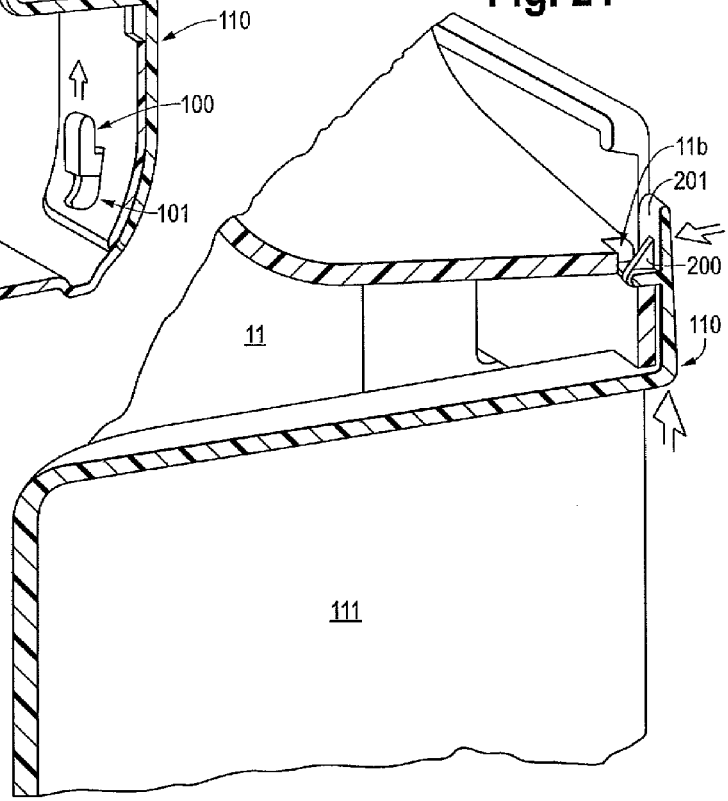

PANEL ATTACHMENT FOR WATER COOLER

BACKGROUND OF THE INVENTION

The present invention generally relates to water coolers. More particularly, the invention relates to the replacement of exterior panels of a water cooler. For example, when the exterior panel of a water cooler becomes damaged or outdated, it may be desirably replaced.

Known methods for replacing the exterior panels of water coolers are time consuming. As one example, when a water cooler is sent to a service center for panel replacement, conventional, previously known water cooler models may have an exterior panel secured to the water cooler wrapper (or cabinet housing) by multiple (e.g., twenty-three (23)) screws. Multiple steps must be taken to replace the panel: removing the liquid dispensing module, bottle ring, and POU float kit; unscrewing the faucets on the front of the cooler; unscrewing four (4) screws from the back of the unit and four (4) screws from the bottom of the unit; taking off the wrapper; unscrewing and removing the twenty-three (23) screws and the rubber seats in order to remove the panels; placing the new panel on the wrapper; screwing back on the twenty-three (23) screws and rubber seats; reassembling the wrapper; screwing back on the four (4) screws from the back and four (4) screws from the bottom of the unit; screwing back in the faucets; and replacing the liquid dispensing module, bottle ring, or POU float kit.

Replacement of the panel of such a conventional water cooler under this method took approximately 15 to 20 minutes to complete. Thus a service person replacing panels on multiple water coolers can expend many hours of valuable labor time on this task. In addition, the above steps of the panel replacement process require many parts of the cooler to be disassembled, which can lead to the potential loss of parts, or error in reassembly.

It would be advantageous to devise a method for renewing a water cooler's exterior panels that is time efficient and less complicated and that uses fewer parts than known methods. It would be also advantageous to provide the water cooler customer with a system that allowed the customer to easily change the exterior of the cooler based on the desired aesthetic. Accordingly, there is a need to renew water cooler exteriors with fewer steps and by removing fewer parts of the water cooler.

SUMMARY OF THE INVENTION

The objects mentioned above, as well as other objects are solved by the present invention, which overcomes disadvantages of prior methods of replacing a water cooler's exterior panel, while providing new advantages not believed associated with such replacement methods.

One aspect of the present invention provides a water cooler with a wrapper and at least one rapidly detachable exterior panel. The water cooler may have multiple apertures to receive multiple fasteners that may have a hollow shaft. Corresponding rear surface projections located on the rear surface of the panel may be adapted to insert into the wrapper and pass through a portion of the hollow shaft of the fasteners.

In accordance with another aspect of the invention, the fastener may have a body, a first end with an anchor adapter, a tapered second end, and a gap on the body of the fastener. When inserted into the wrapper, the anchor may be located on the outer surface of the wrapper to receive the panel's rear surface projection. The gap on the fastener may enable contraction and expansion of the body of the fastener. The fastener may have at least one hook on the body to grip the wrapper upon expansion of the fastener. The fastener may have at least one hook, which is generally triangular-shaped in cross-section. The fastener may be secured by a screw with a head and a body. The body of the screw may be insertable into the fastener, and may be attachable to the rear surface projection.

According to another aspect of the invention, the fastener may be a grommet.

In accordance with another aspect of the invention, the fastener may be made of hard plastic, metal, or elastomeric material.

According to another aspect of the invention, a method for attaching the exterior panel of a water cooler to the wrapper of a water cooler may include providing a wrapper with front and rear surfaces and multiple apertures to receive corresponding fasteners. The method may also include providing at least one exterior panel having front and rear surfaces and rear surface projections to receive fasteners. The method may also include providing multiple fasteners that may have a body with a hollow shaft, and the body may be inserted into an aperture on the wrapper, and the hollow shaft may receive the rear surface projection. The method may also include inserting the fasteners into corresponding apertures on the wrapper; and attaching the panel to the wrapper by inserting the rear surface projections into the hollow shaft of the fasteners.

In accordance with another aspect of the invention, a method for attaching the exterior panel of a water cooler to the wrapper of a water cooler may also include providing a fastener that may have a body, a first end with an anchor adapter, located on the outer surface of the wrapper to receive the rear surface projection, a tapered second end, and a longitudinal gap in the body of the fastener enabling contraction and expansion of the body of the fastener.

According to another aspect of the invention, a method for attaching the exterior panel of a water cooler to the wrapper of a water cooler may also include providing a screw with a head and a body. The body of the screw may be inserted into the fastener, thereby securing the panel to the rear surface projection of the wrapper.

In accordance with another aspect of the invention, a method for attaching the exterior panel of a water cooler to the wrapper of a water cooler may include, providing a wrapper with at least one aperture to receive a fastener. The panel may have at least one rear surface projection to receive the fastener, and the fastener may have a body that fits within the wrapper aperture and around a rear surface projection. The method may also include pushing the fastener onto the panel projection with the second end of the fastener protruding from the rear panel surface. The method may also include pushing the panel on the wrapper so the rear surface projection with the fastener thereon may insert into the apertures on the wrapper, and may secure the panel to the wrapper.

According to another aspect of the invention, a method for attaching the exterior panel of a water cooler to the wrapper of a water cooler may also include providing a fastener with at least one hook, which is generally triangular-shaped in cross-section.

In accordance with another aspect of the invention of a water cooler may have a wrapper and at least one detachable exterior panel. One or more tensioning devices may be used to cause the exterior panel to be placed in frictional and removable engagement against the wrapper.

In another aspect of the invention, the wrapper may have at least one aperture adapted to receive the tensioning devices. The panel may have at least one aperture to hold the tensioning device. The aperture that holds the tensioning device may be an L-shaped rear surface projection. The tensioning device may be removably attached to the L-shaped rear surface projection. The one or more tensioning devices may each be a leaf spring. The leaf spring may have a first and second end. The leaf spring may have a shoe removably attached to one end. However, the leaf spring and shoe may be one integral piece. There may also be a securing means on the panel to prevent the panel from disengaging from the wrapper.

In accordance with another aspect of the invention, the wrapper may be made from high-density polyethylene (HDPE). The panel may be made from Acrylonitrile butadiene styrene (ABS). The shoe may be made from polyoxymethylene (POM).

According to another aspect of the invention, a method for attaching the exterior panel of a water cooler to the wrapper of a water cooler may include providing at least one exterior panel and a wrapper adapted to receive the exterior panel. The method may also include providing one or more tensioning devices. The tensioning devices may cause the exterior panel to be placed in frictional and removable engagement against the wrapper.

In accordance with another aspect of the invention, a method for attaching the exterior panel of a water cooler to the wrapper of a water cooler may also include providing a wrapper comprising high density polyethylene (HDPE).

According to another aspect of the invention, a method for attaching the exterior panel of a water cooler to the wrapper of a water cooler may also include providing a panel comprising acrylonitrile butadiene styrene (ABS).

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Wrapper" means the portion of the water cooler that constitutes the main housing and/or supports the water cooler, also known as the cabinet.

"Exterior panel" means the front surface of the water cooler, attached to the front portion of the wrapper.

"Grommet" means a device used to reinforce an aperture to which fasteners are affixed.

"Fastener" means a device used to secure the wrapper of a water cooler to the exterior panel, such as but not limited to screws and grommets. A "fastener" may, but need not be, threaded.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 1 is a front view of a preferred embodiment of a water cooler with the exterior panel unattached;

FIG. 1A is a partial view of the rear of the preferred embodiment of the exterior panel shown in FIG. 1;

FIG. 2 is a front view of a preferred embodiment of a water cooler with exterior panel attached;

FIG. 3 is an enlarged, partial section and cross-section of a portion of a preferred embodiment of a water cooler with the exterior panel attached;

FIG. 10 is a front and side view of a preferred embodiment of a fastener;

FIG. 11 is a sectional and perspective view of the front of a preferred embodiment of the wrapper of a water cooler;

FIG. 12 is a partial view of the front of a preferred embodiment of a water cooler wrapper;

FIG. 13 is side and rear view of a preferred embodiment of a water cooler wrapper;

FIG. 14 is a sectional view of the preferred embodiment of the water cooler wrapper of FIG. 12;

FIG. 15 is a front view of a preferred embodiment of a water cooler with the exterior panel unattached;

FIG. 16 is a sectional view of the preferred embodiment of the water cooler wrapper of FIG. 15;

FIG. 17 is a sectional view of the preferred embodiment of the water cooler wrapper of FIG. 15 with the exterior panel attached;

FIG. 18 is a rear and side view of FIG. 17;

FIG. 19 is a partial sectional rear and side view of a preferred embodiment of a water cooler with a removable exterior panel;

FIG. 20 is an exploded view of a portion of FIG. 19; and

FIG. 21 is a side sectional view of the preferred embodiment of FIG. 19.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Figure 4:
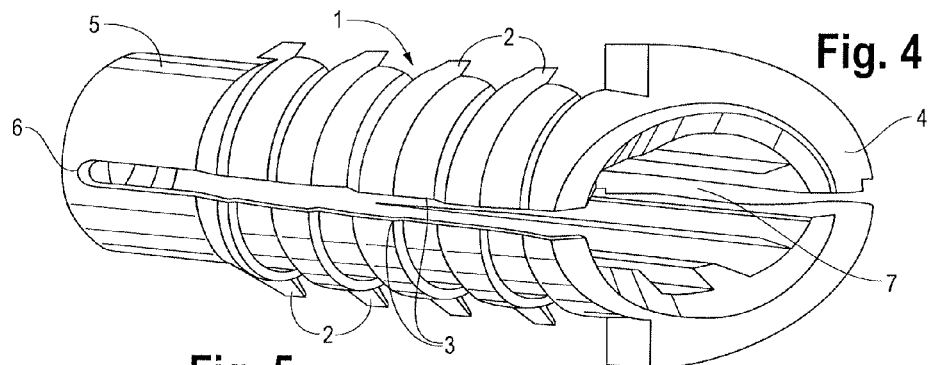
FIG. 4 is a side perspective of a preferred embodiment of a fastener.

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Referring first to FIGS. 1-8, a preferred embodiment of water cooler 10 with a removable exterior panel 50 is shown. Panel 50 removably attaches to wrapper 11 of a water cooler (as shown in FIG. 2). Panel 50 may comprise multiple pieces, such as a top, middle and bottom panel portion (not shown). Panel portions may be separate pieces or integrally connected to each other. The front surface of wrapper 11 includes multiple apertures 12 (as shown in FIG. 1), each adapted to receive a fastener 1, such as those shown in FIG. 4 or 10. Projecting rearwardly from the rear surface 50a of exterior panel 50 are fastener attachment projections 51, which may be cylindrical projections formed integrally with panel 50 (as shown in FIG. 1A). As shown in FIGS. 1 and 2, to attach panel 50 to the front surface of wrapper 11, the panel is located in front of and over the wrapper, and aligned such that projections 51 may be press-fit into the corresponding openings 7 of fasteners 1. Replacing a rapidly detachable panel using this preferred embodiment has been found to take a user approximately five (5) minutes—a significant drop in the amount of time it took to replace a panel using previously known methods.

Referring now to FIG. 3, a detailed perspective of a preferred embodiment of fastener 1 receiving the panel projections 51 is shown. To attach panel 50 to the wrapper 11 a user pushes the panel 50 (as shown in FIG. 1) over the front surface of the wrapper 11 so that projections 51 align with the multiple openings 7 of the fastener 1 on the wrapper 11.

In yet another preferred embodiment, an alternative method may be employed to attach panel 50 to the wrapper 11. Projecting rearwardly from the rear surface 50a of exterior panel 50 are fastener attachment projections 51, which may be cylindrical projections formed integrally with panel 50 (as shown in FIG. 1A). Openings 7 of fasteners 1 may be press-fit onto projections 51. Then, a user may push panel 50 over the front surface of wrapper 11 so that projections 51 with fasteners 1 affixed thereon, align with multiple apertures 12, each adapted to receive a fastener 1 on wrapper 11.

Figure 5:
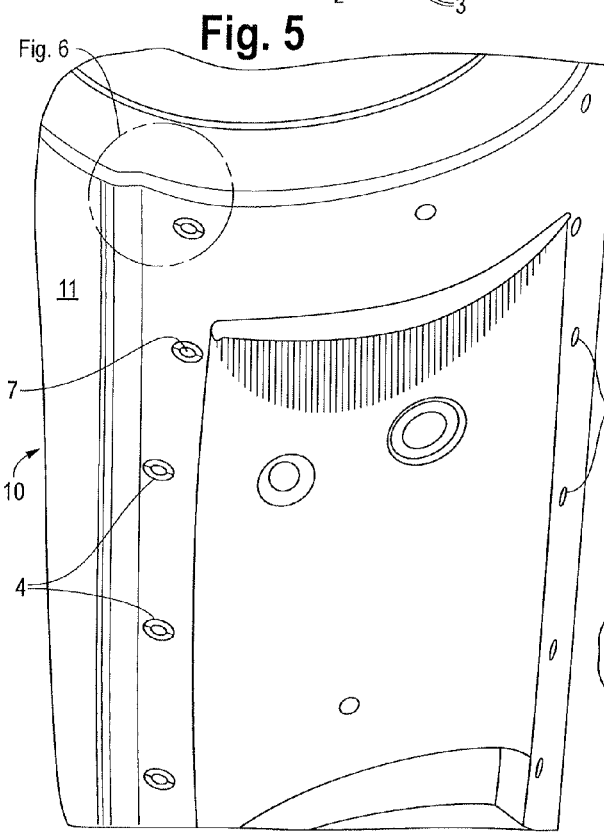
FIG. 5 is an enlarged, partial sectional and partial perspective view of the front of a preferred embodiment of the wrapper of a water cooler.
Figure 6:
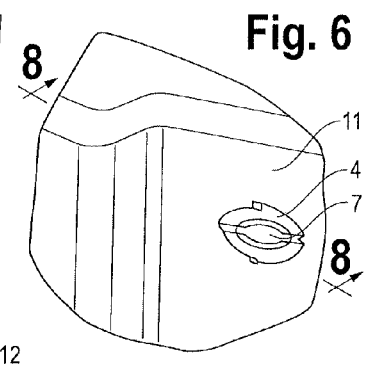
FIG. 6 is a partial view of the front of the preferred embodiment of the water cooler wrapper shown in FIG. 5.
Figure 7:
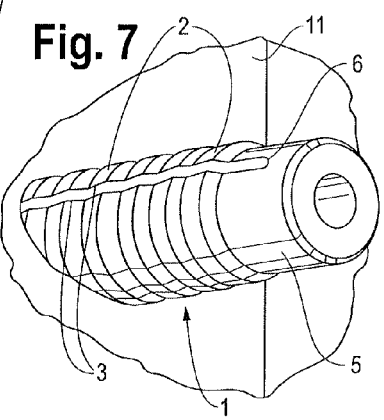
FIG. 7 is side and rear view of the partial water cooler wrapper shown in FIG. 6.
Figure 8:
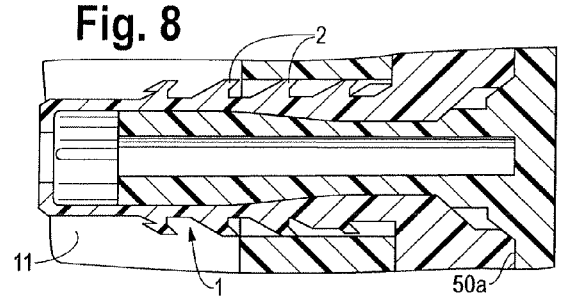
FIG. 8 is a sectional view of the preferred embodiment of the water cooler wrapper of FIG. 6.

Fasteners 1 may be of various shapes, sizes and functions. Referring to FIG. 4, fastener 1 shown in this preferred embodiment is an anchor shape, with the first end 4 termed an anchor adapter. Referring to FIG. 5, the preferred embodiment of anchor-shaped fastener 1 (shown in FIG. 4) has been inserted into apertures 12 on wrapper 11. First end (anchor adapter) 4 is shown sitting on the wrapper's 11 surface, and has an opening 7 (FIG. 6). The second end 5 of the fastener 1 is shown protruding from the rear surface of the wrapper 11 (FIG. 7). In the preferred embodiment shown in FIG. 4, anchor-shaped fastener 1 may also have hooks 2 located on its body 3. The hooks function to retain the panel in firm engagement with the wrapper.

Referring again to FIG. 4, second end 5 is preferably tapered to easily fit into apertures 12 on wrapper. When using fastener 1 shown in this preferred embodiment, a user squeezes body 3 of anchor-shaped fastener 1, closing gap 6 and contracting body 3, allowing the user to easily push the second end 5 of anchor-shaped fastener 1 into aperture 12 on wrapper 11. Once anchor-shaped fastener 1 (FIG. 4) has been inserted in aperture 12 and released by the user, it expands and hooks 2 grip the walls of the wrapper's apertures 12 (as shown in more detail in FIGS. 3 and 8).

Figure 9:
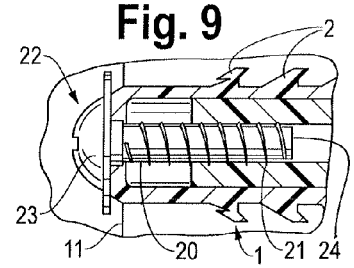
FIG. 9 is a side sectional view of a preferred embodiment of a fastener.

Referring now to FIG. 9, another preferred embodiment is shown. Here, an anchor-shaped fastener 1 is used with a screw 22 for additional security. The screw has a head 23 and body 20 with threads 21. In this preferred embodiment, screw 22 may be inserted after panel 50 has been attached to wrapper 11. The distal end 24 of the screw is received into opening 7 of the fastener. Use of the screw is not preferred, however as a user will not be able to take advantage of all of the time-saving methods for replacing panel 51 available to those using the previously disclosed embodiments. In order to save assembly/disassembly time, only a few screws in key locations may be used.

Referring now to the fastener example shown in FIG. 10, fastener 1 is a grommet. The body 3 of this fastener 1 has a hollow shaft 7 and an exterior surface 3 and an interior surface (not shown). In this preferred embodiment, hooks or threads 30 are shown, but are not necessary. The hooks or threads 30 can have a triangular shape, such that the base of the thread is wider and the thread narrows to a point from the base (as can be seen in FIGS. 10 and 13). Threads 30 of grommet fastener 1 provide additional friction when the fastener is pushed into wrapper aperture 12 (in FIG. 11).

Referring now to FIGS. 11-13, with the preferred embodiment of fastener 1 as shown in FIG. 10, panel 50 removably attaches to wrapper 11 of a water cooler. Panel 50 may comprise multiple pieces, such as a top, middle and bottom panel portion (not shown). The front surface of wrapper 11 includes multiple apertures 12, each adapted to receive a fastener 1. Projecting rearwardly from the rear surface 50a of exterior panel 50 are fastener attachment projections 51, which may be cylindrical projections formed integrally with panel 50 (as shown in FIG. 1A). Fasteners 1 are pushed onto projections 51 (not shown). To attach panel 50 to the front surface of wrapper 11, the panel is located in front of and over the wrapper, and aligned such that projections 51 with fasteners 1 attached thereon may be press-fit into the corresponding apertures 12 on the wrapper 11.

Fastener 1 may be made of many materials, including but not limited to a hard plastic, a metal, or an elastomeric material. Panel 51 preferably is made of a material with glossy, smooth finish, such as Acrylonitrile butadiene styrene (ABS), polycarbonate (PC), or Polystyrene (PS). The wrapper 11 may be made of a high-density polyethylene (HDPE), ABS, PC or PS.

Referring now to FIGS. 15-21, yet another preferred embodiment of a water cooler 10 with a removable exterior panel is shown.

Referring to FIG. 15, exterior panel may comprise multiple pieces, such as a top (not shown), middle (not shown) and bottom panel portion 110. Bottom panel 110 may have an alcove 111 attached thereto. Alcove 111 may fit into aperture 301 in wrapper 11. Alcove 111 may be used as a storage space for water cooler supplies such as cups, instant coffee, creamer or sugar.

Referring again to FIGS. 15-21, preferred embodiments of a water cooler 10 that utilizes one or more tensioning devices (i.e. 102 in FIG. 16) to attach wrapper 11 to bottom panel 110 are shown. The embodiments allow panel 110 to be even more easily attached and detached from wrapper 11. For example, it will only take approximately one to two minutes to change a top and bottom panel (without changing the center panel). (The center panel may be locked with faucet and usually has less chance of getting scratched due to its concave shape. If the center panel is changed, faucets may have to be unscrewed and then screwed back on, adding an additional 30 seconds to 1 minute).

Referring now to FIG. 15, the exterior panel 110 shown in this embodiment has six (6) L-shaped rear surface projections 100 that may be integrally attached to the rear surface 110a of panel 110 to hold leaf spring 102. However L-shaped projection 100 is not necessary, any device that could prevent the leaf spring 102 from being bent, damaged or dislocated during part storage, transportation or assembly/disassembly process will suffice. Projections 100 may be slidably inserted into corresponding apertures 101 on wrapper 11 (as shown in FIG. 16). In the preferred embodiment shown here, in order to be moved to the engaged position, the bottom panel 110 slides up (FIG. 16); however, water cooler 10 may be designed so panel 110 may slide up, down, left or right.

Referring to FIG. 16, to attach panel 110 to wrapper 11, a preferred embodiment of a tensioning device, leaf spring 102, may be inserted between L-shaped rear surface projection 100 and wrapper 11 in pocket 103 created by guard 104 and rear interior portion of L-shaped rear surface projection (not shown). The leaf spring shown in the preferred embodiment of FIG. 16 may be secured into pocket 103 when a portion of the first end 102a of the leaf spring, flange 106, is inserted into retaining aperture 105 on rear portion of L-shaped rear surface projection 100.

Referring to FIG. 18, when the panel 110 is attached to wrapper 11, second end of the leaf spring 102b pushes against the interior surface 11 a of wrapper 11 (not shown).

Referring now to FIGS. 17 and 18, in the preferred embodiment shown, with the panel 110 attached to wrapper 11, second end 102b of leaf spring 102 may include a shoe 107 which allows for smooth movement on the interior along the surface of wrapper 11 while sliding projections 100 into apertures 101 on wrapper 11. With leaf spring 102 in place within pocket 103, and affixed by flange 106 at its first end 102 a within aperture 105, panel 110 will be pushed towards wrapper 11, thereby securing the pieces together Referring now to FIGS. 19-21, another preferred embodiment of a water cooler with a removable exterior panel is shown. The provided friction of the aforementioned embodiments may be sufficient to secure exterior panel 110 to wrapper 11. However, additional securing means to lock panel 110 and prevent it from sliding out may be added as well, including but not limited to screws (not shown) or stops (cantilevers) 200 (as shown in FIGS. 19-21) to prevent panel 110 from disengaging from wrapper 11. Stops 200 may be integrated to panel 110 and will prevent panel 110 from sliding around on wrapper 11 by stopping at a cut out portion 11b of wrapper 11 (as shown in FIG. 19). As shown in FIG. 15, the location of stops 200 may vary in different embodiments.

Referring to FIGS. 20-21, locking of panel 110 to wrapper 11 is shown. Tab 201 pulls away from wrapper 11. When panel 110 is slid in and up into wrapper 11 (as shown in FIG. 19), by inserting projections 100 into apertures 101, stop 200 catches at cut out portion 11b thereby locking panel 110 in place.

In the preferred embodiments of the water cooler 10 shown in FIGS. 15-21, the water cooler combines low cost materials with materials that satisfy a customer's aesthetic desires (which are often more costly). For example, wrapper 11 may be made from a low cost material such as blow molded High Density Polyethylene (HDPE). However, panel 110 preferably may be made of a glossy material with a smooth finish, such as acrylonitrile butadiene styrene (ABS), polycarbonate (PC), or polystyrene (PS). Shoe 107 is ideally made from a plastic with a high stiffness, low friction, and dimensional stability, such as polyoxymethylene (POM). Shoe 107 may also be integrated with leaf spring 102 as one piece.

The above description is not intended to limit the meaning of the words used in the following claims that define the invention. Other systems, methods, features, and advantages of the present invention will be, or will become, apparent to one having ordinary skill in the art upon examination of the foregoing drawings, written description and claims, and persons of ordinary skill in the art will understand that a variety of other designs still falling within the scope of the following claims may be envisioned and used.

It is contemplated that these or other future modifications in structure, function or result will exist that are not substantial changes and that all such insubstantial changes in what is claimed are intended to be covered by the claims.

I claim:

1. A water cooler with a wrapper and at least one exterior, snap-fit panel which engages directly to the wrapper and is capable of being rapidly joined as well as rapidly detached from the wrapper without a need for using screws, the at least one exterior panel including a plurality of rear surface projections, wherein the wrapper has a plurality of apertures which receive a corresponding plurality of press-fit, expandable and compressible fasteners, the fasteners each comprising a hollow shaft, and wherein each of the projections insert into the corresponding wrapper apertures and pass through at least a portion of the hollow shaft of the corresponding fasteners, whereby due at least in part to the expandable and compressible nature of the press-fit fasteners, the at least one exterior panel is assembled to a wrapper in a snap-fit fashion, and rapidly joins and rapidly detaches from wrappers having varying wall thicknesses;
wherein each press-fit fastener comprises:
a body;
a first end with an anchor adapter that is located on the outer surface of the wrapper and receives the corresponding rear surface projection;
a tapered second end; and
a gap on the body of the fastener, wherein the gap enables contraction and expansion of the body of the fastener.

2. The water cooler of claim 1, wherein each fastener comprises at least one hook on the body which grips the wrapper upon expansion of the fastener.

3. The water cooler of claim 1, wherein each fastener further comprises at least one hook, which is generally triangular-shaped in cross-section.

4. The water cooler of claim 1, wherein each fastener comprises at least one of the following: a hard plastic; a metal; and an elastomeric material.

5. The water cooler of claim 1, wherein each fastener comprises a grommet.

6. The water cooler of claim 1, wherein the panel comprises Acrylonitrile butadiene styrene (ABS).

7. A water cooler, comprising:
a wrapper having a plurality of apertures;
at least one snap-fit exterior panel which directly engages the wrapper, wherein the at least one exterior panel carries rearwardly-extending projections which mate within the wrapper apertures, and the at least one exterior panel is capable of being rapidly joined as well as rapidly detached from the wrapper without a need for using screws; and
one or more tensioning devices associated with the rearwardly-extending projections, wherein the one or more tensioning devices cause the exterior panel to be placed in frictional and removable engagement against the wrapper, whereby due at least in part to the use of the tensioning devices, the at least one snap-fit exterior panel rapidly joins and rapidly detaches from wrappers having varying wall thicknesses;
wherein each wrapper aperture holds a corresponding tensioning device, and each rearwardly-extending projection comprises an L-shaped rear surface projection, and wherein each tensioning device is removably attached to the corresponding L-shaped rearwardly-extending projection.

8. The water cooler of claim 7, wherein the one or more tensioning devices each comprise a leaf spring.

9. The water cooler of claim 8, wherein each leaf spring has first and second ends.

10. The water cooler of claim 9, further comprising one or more shoes that are each removably attached to a respective end of the leaf spring.

11. The water cooler of claim 10, wherein each shoe comprises polyoxymethylene (POM).

12. The water cooler of claim 8, wherein an end of each leaf spring is a shoe.

13. The water cooler of claim 7, wherein the wrapper comprises High Density Polyethylene (HDPE).

14. The water cooler of claim 7, wherein the panel comprises Acrylonitrile butadiene styrene (ABS).

15. The water cooler of claim 7, further comprising a securing means on the panel to prevent the panel from disengaging from the wrapper.

\* \* \* \* \*